E. H. Crane,
Cage Trap,

Nº 43,396. Patented July 5, 1864.

Witnesses:

Inventor:
E. H. Crane

UNITED STATES PATENT OFFICE.

ELLIOTT H. CRANE, OF JONESVILLE, MICHIGAN.

IMPROVEMENT IN ANIMAL-TRAPS.

Specification forming part of Letters Patent No. 43,396, dated July 5, 1864.

*To all whom it may concern:*

Be it known that I, ELLIOTT H. CRANE, of Jonesville, in the county of Hillsdale and State of Michigan, have invented a new and Improved Game-Trap; and I do hereby declare that the following is a full, clear, and exact description of the same, reference being had to the accompanying drawings, making a part of this specification, in which—

Figure 1:
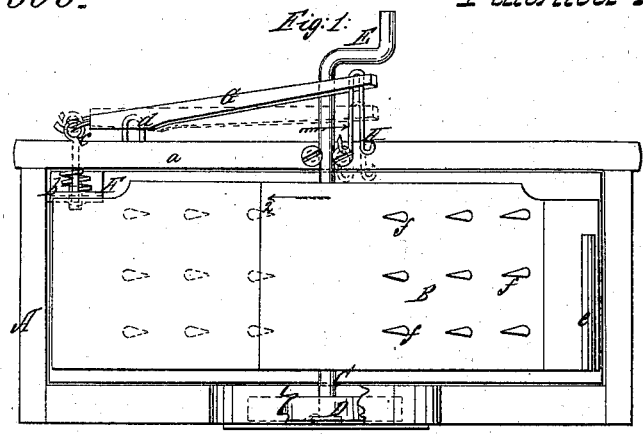
Figure 2:
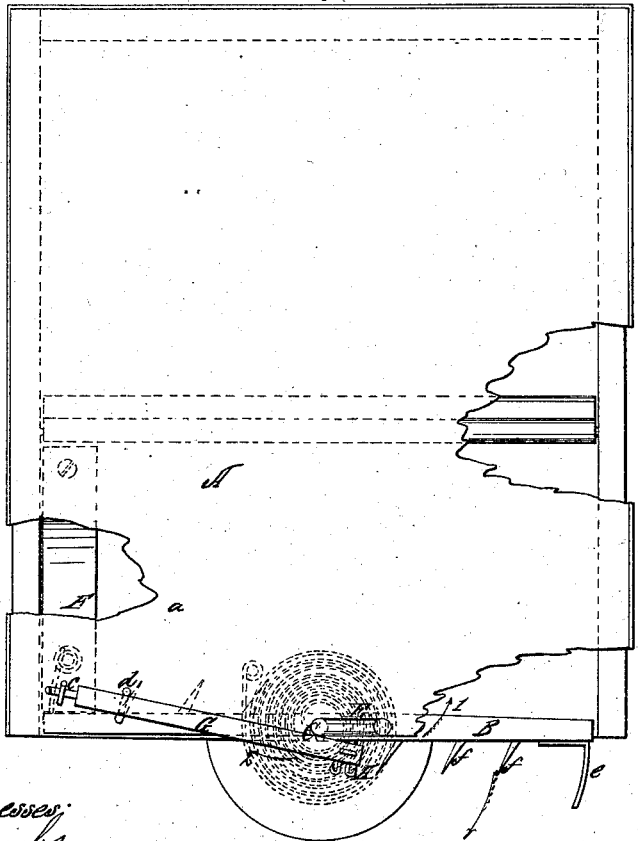

Figure 1 is an end view of my invention; Fig. 2, a plan or top view of the same, partly in section.

Similar letters of reference indicate corresponding parts in the two figures.

This invention relates to a new and improved trap designed for catching game and annoying animals, such as rats, mice, &c.

The invention consists in the employment or use of a box which may be of rectangular form and provided at one end with a door hung on a vertical central shaft, the lower end of which is connected to a coil-spring and the upper end provided with a crank, said door being armed with teeth and blades, and used in connection with a stop and trigger-bar, all being arranged, as hereinafter fully set forth, so as to afford a simple and efficient self-setting trap.

To enable those skilled in the art to fully understand and construct my invention, I will proceed to describe it.

A represents a box of rectangular form and of any suitable dimensions, and constructed of wood or other proper material. At one end of this box is a door, B, which is hung on a vertical shaft, C, the bearings of which are at the center of the end of the box A. The lower end of this shaft C is attached to the inner end of a coil-spring, D, and the upper end is provided with a crank, E. The door B is allowed to turn in the end of the box A, and the spring D is wound up by turning the shaft C, and consequently the door, in the direction indicated by arrow 1.

F is a stop which is placed within the box A, and is secured to the under side of the top *a* thereof by a screw or other means. This stop is formed of an elastic bar of wood or metal and the inner end of the same is secured to the box, the stop being near one side of the same and its front end being sufficiently low to catch against the end of the door and prevent it from turning under the action of the spring D. The outer part of the stop F has a spiral spring, *b*, bearing upon it which tends to keep the stop down, so that it will present an obstruction to the door and prevent the turning thereof. To the outer part of the stop F there is attached a rod, *c*, which passes up through the top *a* of the box and is connected to a bar or lever, G, which has its fulcrum at *d*. This bar or lever G extends a short distance past the shaft C and has a hook, H, attached to it to receive the bait. The door B is provided with a curved plate, *e*, at each end and at opposite sides of it, and is also provided with teeth or spikes *f*.

From the above description it will be seen that when an animal nibbles the bait on the hook H it will draw down the outer end of the bar or lever G, and thereby raise the front or outer end of the stop F, so that the door B will be instantly turned, under the action of the spring D, in the direction indicated by arrow 2, and the animal forced into the box A, the stop F being immediately forced down under the action of the spring *b* as soon as the bar or lever G is released and in time to arrest the door B when it has made a half-revolution. Thus the trap sets itself and continues to do so until the spring is run down, and the spring is wound up at any time by turning the shaft in the direction indicated by arrow 1. The spikes or teeth *f* serve to pierce and wound the animal, so that it cannot effectually make any attempts to escape from the box A, and the curved plates *e* serve to insure the forcing of the animal within the box by the door B. The whole arrangement is extremely simple and efficient.

Having thus described my invention, what I claim as new, and desire to secure by Letters Patent, is—

The combination of the horizontally-revolving door B, vertical shaft C, crank E, spring D, stop F, external trigger, G, bait-hook H, and guard-plates *e e*, all being arranged to operate in the manner and for the purposes specified.

ELLIOTT H. CRANE.

Witnesses:
ANDREW P. HOGARTH,
MARTIN RANSOM.